(12) United States Patent
Wingo et al.

(10) Patent No.: US 10,313,575 B1
(45) Date of Patent: Jun. 4, 2019

(54) DRONE-BASED INSPECTION OF TERRESTRIAL ASSETS AND CORRESPONDING METHODS, SYSTEMS, AND APPARATUSES

(71) Applicant: Talon Aerolytics (Holding), Inc., West Point, GA (US)

(72) Inventors: Austin Wingo, Opelika, AL (US); Phillip Bevel, Opelika, AL (US); Eric S Hare, Opelika, AL (US)

(73) Assignee: Talon Aerolytics, Inc., West Point, GA (US)

( * ) Notice: Subject to any disclaimer, the term of this patent is extended or adjusted under 35 U.S.C. 154(b) by 200 days.

(21) Appl. No.: 15/656,933

(22) Filed: Jul. 21, 2017

Related U.S. Application Data (60) Provisional application No. 62/421,761, filed on Nov. 14, 2016.

(51) Int. Cl.
| | |
|---|---|
| *H04N 5/232* | (2006.01) |
| *G06K 9/00* | (2006.01) |
| *G06T 3/40* | (2006.01) |
| *B64C 39/02* | (2006.01) |
| *G05D 1/10* | (2006.01) |

(52) U.S. Cl.
CPC ....... *H04N 5/23203* (2013.01); *B64C 39/024* (2013.01); *G05D 1/101* (2013.01); *G06K 9/00637* (2013.01); *G06T 3/4038* (2013.01); *H04N 5/23216* (2013.01); *H04N 5/23296* (2013.01); *B64C 2201/108* (2013.01); *B64C 2201/127* (2013.01); *B64C 2201/141* (2013.01); *G06T 2200/32* (2013.01)

(58) Field of Classification Search
CPC .................................................. H04N 5/23203
USPC ......................................................... 348/125
See application file for complete search history.

(56) References Cited

U.S. PATENT DOCUMENTS

| | | | |
|---|---|---|---|
| 8,787,619 | B2 | 7/2014 | Del Frande |
| 9,439,092 | B1 | 9/2016 | Chukka et al. |
| 2010/0025582 | A1 | 2/2010 | Weil |
| 2015/0025914 | A1 | 1/2015 | Lekas |
| 2015/0304576 | A1 * | 10/2015 | Horak ................... G06T 3/0018 348/37 |
| 2015/0356482 | A1 | 12/2015 | Whipple et al. |
| 2016/0216245 | A1 | 7/2016 | Sutton |
| 2016/0229533 | A1 * | 8/2016 | van Cruyningen ... B64C 31/024 |
| 2016/0284075 | A1 | 9/2016 | Phan et al. |
| 2016/0334276 | A1 | 11/2016 | Pluvinage |
| 2016/0373662 | A1 | 12/2016 | Olsen |
| 2017/0015416 | A1 | 1/2017 | O'Connor et al. |
| 2017/0017846 | A1 | 1/2017 | Felemban et al. |

* cited by examiner

*Primary Examiner* — Yulin Sun
(74) *Attorney, Agent, or Firm* — Philip H. Burrus, IV (57) ABSTRACT

A terrestrial asset inspection system includes a drone (101). One or more processors (105) of the drone receive one or more image capture parameters (202), which can include a minimum number of images per unit area (206), a minimum overlap amount for any two adjacent images (207), or other factors. The one or more processors also receive geographical boundary information (222) of the terrestrial asset (400). At least one flight plan (122) is determined as a function of these parameters, and the drone flies in accordance with the flight plan while an image capture device (108) captures a plurality of images (501) meeting or exceeding the image capture parameters to inspect the terrestrial asset.

20 Claims, 6 Drawing Sheets

FIG. 6

DRONE-BASED INSPECTION OF TERRESTRIAL ASSETS AND CORRESPONDING METHODS, SYSTEMS, AND APPARATUSES

CROSS REFERENCE TO PRIOR APPLICATIONS

This application claims priority and benefit under 35 U.S.C. § 119(e) from U.S. Provisional Application No. 62/421,761, filed Nov. 14, 2016, which is incorporated by reference for all purposes.

BACKGROUND

Technical Field

This disclosure relates generally to inspection systems, and more particularly to systems, methods, and apparatuses for inspection of wireless communication towers.

Background Art

Large land bound structures, such as solar panel farms, building and construction sites, agricultural installations, and other terrestrial assets can be challenging to inspect. Such assets are sometimes too large or too tall for a person to visually inspect from the ground. While ladders, towers, and even helicopters can be used for asset inspection, each presents its own challenges. Ladders are unwieldy and cumbersome to use, while towers suffer from being permanently fixed at particular locations, which limits the viewing range therefrom. Helicopters are just plain expensive.

Compounding this visibility issue is the fact that the inspector may not know how to perform an inspection—or identify any anomalies—without significant training. This training is expensive and limits the number of personnel who may be qualified to perform inspections, even where they are able to fly helicopters. It would be advantageous to have an improved inspection system that made both the inspection and anomaly identification process simpler and more efficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using unmanned aircraft to perform wireless terrestrial asset inspection. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to unmanned aircraft devices, improve the inspection process of terrestrial assets, in addition to reducing the chance that any anomalies from the inspection will be missed.

It will be appreciated that embodiments of the disclosure described herein may be comprised of one or more conventional processors and unique stored program instructions that control the one or more processors to implement, in conjunction with certain non-processor circuits, some, most, or all of the functions of unmanned aircraft control to inspect terrestrial assets as described herein. The non-processor circuits may include, but are not limited to, a radio receiver, a radio transmitter, image-capture devices, aerial propulsion devices, signal drivers, clock circuits, power source circuits, and user control devices. As such, these functions may be interpreted as steps of a method to perform asset inspection using unmanned aircraft. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. As used herein, components may be "operatively coupled" when information can be sent between such components, even though there may be one or more intermediate or intervening components between, or along the connection path. The terms "substantially" and "about" are used to refer to dimensions, orientations, or alignments inclusive of manufacturing tolerances. Thus, a "substantially orthogonal" angle with a manufacturing tolerance of plus or minus two degrees would include all angles between 88 and 92, inclusive. Also, reference designators shown herein in parenthesis indicate components shown in a figure other than the one in discussion. For example, talking about a device (10) while discussing figure A would refer to an element, 10, shown in figure other than figure A.

Embodiments of the present disclosure provide methods, systems, and apparatuses that allow unmanned aircraft, referred to herein as "drones" or "unmanned aerial vehicles," to inspect terrestrial assets in a controlled, consistent, and advantageous manner. Such unmanned aircraft comprise vehicles capable of flight and navigation without an onboard, human pilot. General unmanned aircraft, as well as their methods of control by remote pilots or one or more onboard processors, will be obvious to those of ordinary skill in the art having the benefit of this disclosure. Moreover, the selection of commercially available unmanned aircraft and/or design of custom unmanned aircraft suitable for executing the methods described below will be obvious to those of ordinary skill in the art having the benefit of this disclosure.

For simplicity of discussion, a solar panel farm will be used below as an illustrative example of a terrestrial asset. However, it should be noted that the methods, apparatuses, and systems described below could be used to inspect any number of terrestrial assets. Examples of such terrestrial assets include agricultural installations, timber plots, buildings, construction sites, automotive dealerships, parks, and recreational sites. Still other terrestrial assets will be obvious to those of ordinary skill in the art having the benefit of this disclosure.

In one or more embodiments, unmanned aircraft are configured to inspect a terrestrial asset by capturing a plurality of photographs taken as the unmanned aircraft proceeds along all—or a portion—of a flight plan. In one or more embodiments, the plurality of photographs must satisfy two criteria: First, any two adjacent images, i.e., any two successive images capturing adjacent areas of the terrestrial asset, must include a minimum overlap. For example, in one embodiment any two adjacent photographs must include a minimum of ninety-percent overlap. That means that the difference in the amount of area captured by two successive images will change by only ten percent, with ninety percent of the area depicted in the two successive images being the same. Second, the plurality of images must consist of at least a minimum number of images per unit area. For example, in one embodiment, the minimum number of images per unit area is two hundred pictures per acre.

The reason for these requirements—as well as others that may be described below—is that in one or more embodiments the plurality of photographs captured by the unmanned aircraft are later stitched together to form a composite or orthomosaic image. Illustrating by example, in one or more embodiments the successive images captured by the unmanned aircraft will be pieced together to form an orthomosaic image that depicts a "bird's eye view" of the entire terrestrial asset in a single images. In one or more embodiments, subsequent processing, such as image recognition processing and marking processing, can then identify anomalies and mark the same. Accordingly, the owner of a solar panel farm using embodiments of the disclosure can quickly, cheaply, reliably, and efficiently identify solar cells or panels that may not be operating optimally and may require replacement.

Embodiments of the disclosure advantageously eliminate the need for workers and technicians to climb ladders or towers, or more costly, board helicopters, to perform physical inspections. Moreover, the optical inspection techniques described herein more reliably identify anomalies. Accordingly, labor and capital costs are reduced while the accuracy of the inspection is increased. Moreover, the reliable, overlapping, and repeating image capture provides the owner of the terrestrial asset with an image that can be analyzed after the inspection. This is in contrast to situations where an inspector simply visually inspects the asset from a helicopter, with the only evidence of such inspection residing in his head or in an image captured by a camera that fails to capture the entire asset or the asset with sufficient clarity and granularity required for subsequent analysis. What's more, the unmanned aircraft are smaller than helicopters, moving less air, and therefore can fly closer to the asset without damaging the same by causing debris to fly through the air.

In one or more embodiments, a drone or unmanned aerial vehicle inspects a terrestrial asset in a predefined manner, collecting data associated with the terrestrial asset in accordance with one or more predefined rules. For example, in one or more embodiments one or more processors carried by the unmanned aircraft receive one or more image capture parameters. These image capture parameters can include at least a minimum number of images per unit area and a minimum overlap amount for any two adjacent images. Additionally, the one or more processors can receive geographical boundary information, e.g., a geographic perimeter boundary definition, for the terrestrial asset.

Once these, and optionally other, predefined rules and/or image capture parameters are received, the one or more processors can determine at least one flight plan to capture a plurality of images meeting any predefined rules and/or image capture parameters. In one embodiment, the at least one flight plan is determined as a function of the minimum overlap amount for any two adjacent images, the minimum number of images per unit area, and the geographic boundary information. When an optimal flight plan is chosen, the one or more processors of the unmanned aircraft fly, using the unmanned aircraft's propulsion system, the unmanned aircraft along the flight plan capturing the plurality of images. Since the flight plan was a function of the image capture parameters and the geographical boundary information, this results in the plurality of images meeting or exceeding both the minimum number of images per unit area and the minimum overlap between any two adjacent images.

In one or more embodiments, a terrestrial asset inspection system includes an unmanned aircraft that comprises one or more processors, an image capture device operable with the one or more processors, and a propulsion system. The one or more processors of the unmanned aircraft receive one or more image capture parameters, such as the minimum number of images per unit area and the minimum overlap amount for any two adjacent images. The one or more processors also receive geographical boundary information corresponding to the terrestrial asset as well.

Once this information is loaded or otherwise delivered to the one or more processors, they determine at least one flight plan as a function of this information. For example, the one or more processors may determine a flight plan as a function of each of the minimum number of images per unit area, the minimum overlap amount for any two adjacent images, and the geographical boundary information.

The one or more processors can then fly, by controlling the propulsion system, the unmanned aircraft in accordance with the at least one flight plan while the image capture device captures a plurality of images meeting or exceeding both the minimum number of images per unit area and the minimum overlap between any two adjacent images.

After the plurality of images is captured, they can be delivered to an image assembly device. In one or more embodiments, the image assembly device receives the plurality of images from the unmanned aircraft and then assembles the same into an orthomosaic image. In one or more embodiments, a tying point is used to assemble the plurality of images into the orthomosaic image. For example, the image assembly device can identify a tie point across at least a subset of the plurality of images. The tie point can be a rock, structure, tree, landmark, or other item that is easily recognized in multiple images. Thus, the image assembly device can assemble the orthomosaic image occurring as a function of the tie point.

In one or more embodiments, an optical identification device in communication with the image assembly device can then identifying one or more anomalies of the terrestrial asset from the orthomosaic image. An example of an anomaly in a solar panel field is a panel or cell that is no longer converting electromagnetic radiation to current. This means that the panel or cell needs replacing. A marking device operable with the optical identification device can mark one or more anomalies of the terrestrial asset on the orthomosaic image to create a marked orthomosaic image. Accordingly, an owner of the terrestrial asset can easily review the inspection data and rapidly identify the location of such anomalies.

Figure 1:
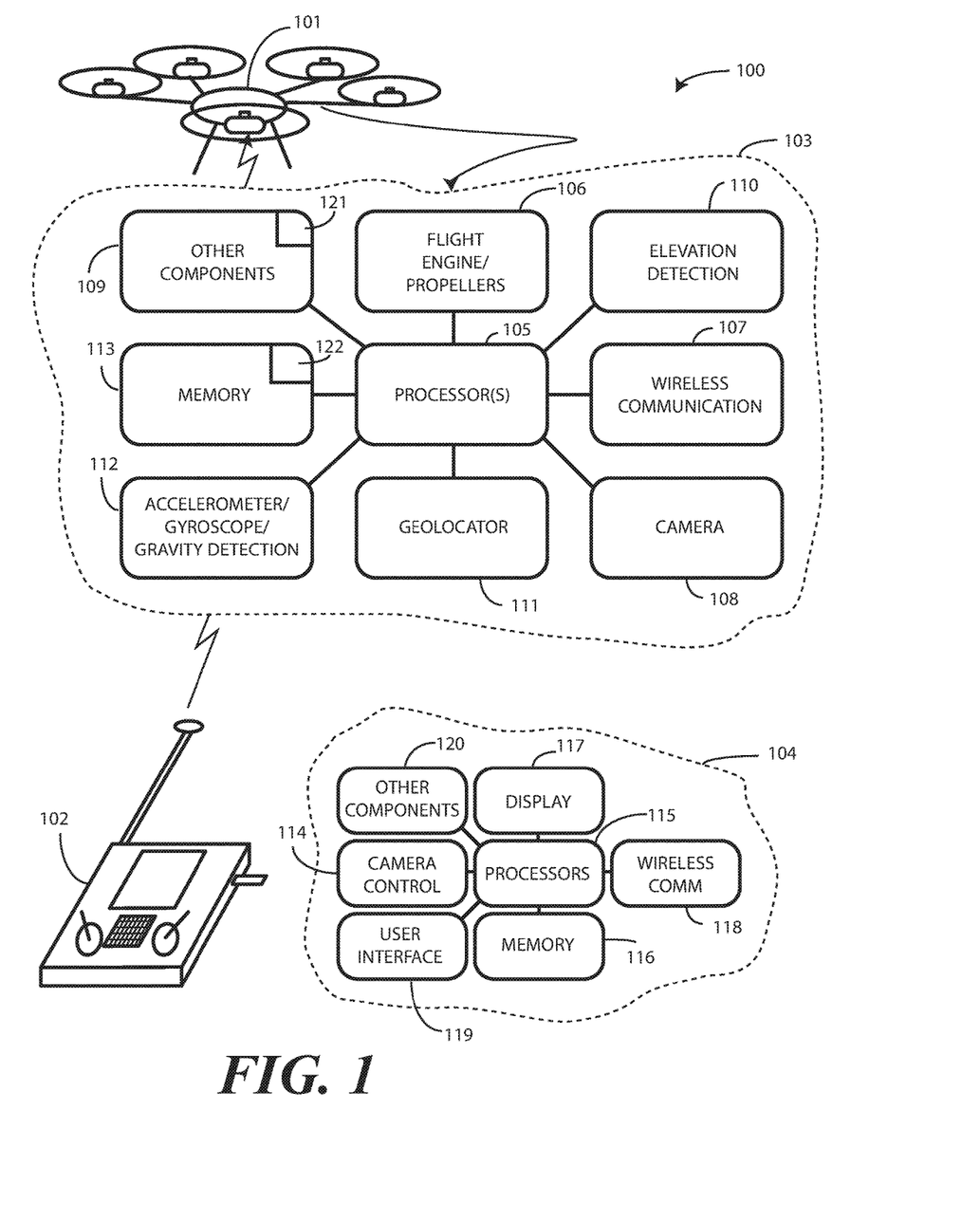
FIG. 1 illustrates one explanatory system in accordance with one or more embodiments of the disclosure.

Turning now to FIG. 1, illustrated therein is one explanatory system 100 in accordance with one or more embodiments of the disclosure. In this illustrative embodiment, the system 100 includes a drone 101 and a control device 102. An illustrative schematic block diagram of each of the drone 101 and the control device 102 is also provided. In FIG. 1, schematic block diagram 103 corresponds to the drone 101, while schematic block diagram 104 corresponds to the control device 102.

It is to be understood that FIG. 1 is provided for illustrative purposes only and for illustrating components of one explanatory drone 101 and one explanatory control device 102 configured in accordance with one or more embodiments of the disclosure. Accordingly, schematic block diagram 103 and schematic block diagram 104 are not intended to be complete schematic diagrams of the various components required for either the drone 101 or the control device 102. Other drones or control devices configured in accordance with embodiments of the disclosure may include various other components not shown in FIG. 1, or may include a combination of two or more components or a division of a particular component into two or more separate components, and still be within the scope of the present disclosure.

In one or more embodiments, the drone 101 includes one or more processors 105. The one or more processors 105 are operable with the other components of the drone 101, e.g., the propulsion system 106 and any corresponding navigation system or guidance system, the wireless communication circuit 107, the on-board image capture device 108, the various sensors, or other components 109.

In one or more embodiments, despite the fact that a control device 102 is provided, the one or more processors 105 are configured to fly the drone 101 autonomously using the propulsion system 106. For example, in one or more embodiments, predefined rules for flight, image capture, or combinations thereof can be input to the one or more processors 105. The one or more processors 105 can then process this information to create one or more flight plans 122, each of which can be stored in the memory 113. Upon selection of a flight plan 122, either by the operator using the control device 102 or by the one or more processors 105 as a function of optimization filters, the one or more processors 105 can then fly, without input from the control device 102, the drone 101 along the flight plan 122 by controlling the propulsion system 106. While inputs from the control device 102, such as the camera control 114, can still be received to control the image capture device 108, in one or more embodiments the one or more processors 105 fly the drone autonomously without input from the control device 102. Of course, the control device 102 includes mechanisms to override this autonomous flight to control the drone 101 as necessary as well.

Examples of sensors operable with the one or more processors 105 include an elevation detector 110, a geolocation detector 111, and one or more orientation sensors 112. Additional sensors can be included as well, such as laser, infrared, ultrasonic, or other types of measuring devices, internal measurement units, heat sensors, smoke detectors, barometers, and so forth. Batteries or other energy storage devices can also be included to power the various components shown in the schematic block diagram 103 as well.

The one or more processors 105 can include a microprocessor, a group of processing components, one or more ASICs, programmable logic, or other type of processing device. The one or more processors 105 can be configured to process and execute executable software code to perform the various functions of the drone 101. A storage device, such as memory 113, can optionally store the executable software code, flight plans, and other data used by the one or more processors 105 during drone operation. The memory 113 may include either or both static and dynamic memory components, may be used for storing both embedded code and user data. The software code can embody program instructions and methods to operate the various functions of the drone 101, and also to execute software or firmware applications and modules. The one or more processors 105 can execute this software or firmware, and/or interact with modules, to provide drone functionality.

The one or more processors 105 can be operable with a wireless communication circuit 107 that communicates with the control device 102. The wireless communication circuit 107 may use any of a number of wireless technologies for communication, such as, but are not limited to, peer-to-peer or ad hoc communications, frequency modulated communication, amplitude modulated communication, or IEEE 802.11 communication. Other forms of wireless communication will be obvious to those having the benefit of this disclosure. The wireless communication circuit 107 can include wireless communication circuitry, one of a receiver, a transmitter, or transceiver, and one or more antennas.

The propulsion system 106 can include one or more rotary wings. In one embodiment, the propulsion system 106 comprises multiple rotary wings. For example, the propulsion system 106 can include four, six, or eight or more rotors configured as propellers. These propellers can be movable between a generally downward oriented direction to directions tilting forward, aft, and side-to-side so as to move the drone 101 up and down and side to side as desired. A user can employ the control device 102 to control the propulsion system to move the drone 101 as desired in one or more embodiments. In other embodiments, one or more firmware modules can be stored in the memory 113 so that the drone 101 can perform flight operations and can fly flight patterns autonomously. Of course, a combination of user driven control through the control device 102 and autonomous flight action can also be implemented.

In one or more embodiments, the propulsion system 106 can include an energy storage device 121, such as a lithium-based or nickel-based rechargeable battery, that propels the rotary wings or propellers. Each propeller can be a two, three, four, or more bladed assembly. Increasing propeller blades decreases noise and increases thrust, while decreasing propeller blades increases efficiency. The exact number of blades or propellers can be selected based upon design, geographic location, typical wind and weather conditions, and so forth. A flight engine operable with the propellers can adjust and change the speeds of each motor driving each propeller to control the speed, direction, and motion of the drone 101.

An image capture device 108 can be configured to capture one or more still or video images in one or more embodiments. In one embodiment, the image capture device 108 can capture images in response to the camera control 114 operable in the control device 102. In another embodiment, the image capture device 108 can capture still or video images on a continual basis while the drone 101 is in operation. In another embodiments, the image capture device 108 can capture the still or video images automatically in response to sensed external stimuli, e.g., an object resembling the shape of an object associated with a terrestrial asset coming into its line of sight.

In one or more embodiments, the image capture device 108 is further operable with the one or more processors 105 to determine and identify characteristics and geo-locational orientations of terrestrial asset data. For example, in one or more embodiments the image capture device 108 can determine azimuth, plumb, and tilt for each row of solar panels in a solar panel farm. This allows the one or more processors 105 to initially calculate an initial vector heading for the drone 101 that allows the flight plan 122 to begin in a direction that is parallel to a major axis of a row of solar panels. In other embodiments, the image capture device 108 can be operational with the geolocation detector 111 and/or the one or more orientation sensors 112 as well.

In one or more embodiments, the one or more processors 105 are operable with the image capture device 108 to capture successive images of an environment. From these successive images, a composite or orthomosaic image of the terrestrial asset can be constructed. For example, where the image capture device 108 comprises an infrared camera, images captured by the infrared camera can be assembled together to create an orthomosaic "heat map" of a terrestrial asset such as a solar panel farm.

In one or more embodiments, the image capture device 108 can identify physical characteristics of terrestrial assets. These physical characteristics can include rusting, physical damage, inoperable solar cells, or other characteristics. For example, in one or more embodiments the image capture device 108 can operate in conjunction with the one or more processors 105 as a damage detection device to determine whether specific cells or panels of a string of solar panels are not working properly.

In one or more embodiments the image capture device 108 is configured with optical recognition such as include image recognition, surface recognition, color recognition, shape recognition, and the like. Advantageously, in one or more embodiments the image capture device 108 can distinguish between solar cells and other objects that may be physically constructed within the terrestrial asset. By recording this distinction in the memory 113 as metadata associated with the still and video images, subsequent analysis of tower assets becomes quicker and more efficient. Additionally, characteristics such as whether a solar cell is inoperable internally, or is instead covered with other debris that may hinder proper operation can be automatically determined.

In one or more embodiments, the image capture device 108 can operate in conjunction with the one or more processors 105 to determine geometric orientation, azimuth angle, tilt angle, plumb angle, and/or location associated with any image captured by the image capture device 108. The one or more processors 105 can capture this information in metadata accompanying the still or video images to define alignment vectors for the drone 101 that correspond to each, individual, image.

The drone 101 can also include one or more orientation sensors 112, such as one or more accelerometers, gyroscopes, gravity detectors, or other devices that can determine the azimuth, plumb, and tilt of the drone 101 itself when in operation. For example, an accelerometer may be used to show vertical orientation, constant tilt and/or whether the drone 101 is stationary or in motion. A gyroscope can be used in a similar fashion. In addition to, or instead of, an accelerometer and/or gyroscope, an electronic compass can be included to detect the spatial orientation of the drone 101 relative to the earth's magnetic field.

The one or more orientation sensors 112 can be used to determine the spatial orientation of the drone 101 when in operation. In one embodiment, the one or more orientation sensors 112 make such determinations by detecting a gravitational direction. This can determine, for example, whether the image capture device 108 is oriented parallel with a reference line that is oriented substantially orthogonally with the vector defining the direction of gravity, above this reference line, or below this reference line.

A geolocation detector 111 can determine a latitude and longitude coordinate location for the drone 101. In one embodiment, geolocation detector 111 comprises a Global Positioning System (GPS) device that determines latitudinal and longitudinal coordinates from a constellation of one or more earth orbiting satellites or from a network of terrestrial base stations. Other systems can be used in place of the GPS system, such as the Global Orbiting Navigation System (GLONASS) or other satellite positioning systems. The geolocaiton detector 11 may also be able to determine location of the drone 101 by locating or triangulating terrestrial base stations of a traditional cellular network or from other local area networks.

An elevation detector 110, such as an altimeter, can be included to determine an altitude of the drone 101 while in operation. Other components 109 could be included as well.

These other components 109 can include light sensors, magnetometers, and laser measuring devices to determine the distance between the drone 101 and the terrestrial asset, an audio capture device to receive acoustic input, and so forth. The other components 109 can include input and output components, such as power inputs and outputs and/or mechanical inputs and outputs. Still other components will be obvious to those of ordinary skill in the art having the benefit of this disclosure. The explanatory drone 101 of FIG. 1 is illustrative only. Numerous other configurations will be obvious to those of ordinary skill in the art having the benefit of this disclosure.

The control device 102 is operable to allow an operator to optionally control the flight of, and optionally the capture of data by, the drone 101. The control device 102 can include one or more processors 115 that are operable with a memory 116. The control device 102 can include a display 117, with which an operator can see still and video images as they are captured by the image capture device 108 of the drone 101.

The control device 102 can send and receive electronic control signals to the drone 101 through a wireless communication circuit 118. The operator can control the drone 101 through a user interface 119, which can include one or more joysticks, knobs, slider controls, rocker controls, touch screens, touch pads, or other devices. For example, the operator may wish to override a flight plan 122 so that the battery or other energy storage device 121 can be changed. Other components 120, such as audio capture devices and audio output devices, can be included as well.

In one or more embodiments, the operator views images captured by the image capture device 108 of the drone 101 on the display 117 as they are captured. In one embodiment, the one or more processors 105 of the drone 101 simply capture pictures automatically. In another embodiment, however, an operator causes the image capture device 108 to capture images by operating the camera control 114. Being able to view images as they are captured assists in ensuring that the inspection is being properly executed.

The display 117 also allows the operator to visually see the environment, as well as any obstacles, power lines, mechanical support wires, and so forth, in real time. In one or more embodiments, the operator is instructed to never navigate the drone 101 under wires. The ability to visually see these wires on the display 117 assists in this directive. In other embodiments, the drone 101 is equipped with autonomous navigation that performs these operations, including never flying under wires, automatically. Where autonomous navigation is included, onboard instrumentation, e.g., the geolocation detector 111, image capture device 108, and/or orientation sensors 112, disposed within the drone 101 automatically recognizes as any obstacles, power lines, mechanical support wires, and so forth, so that they can be avoided.

In one or more embodiments, one or more predefined flight plans 122 can be stored in either the memory 116 of the control device 102 or the memory 113 of the drone 101. These predefined flight plans 122 can direct the drone 101 to execute a flight pattern through a predefined set of inspection points during a terrestrial asset inspection. Examples of such flight plans 122 will be described in more detail below with reference to FIGS. 2, 4, and 5. Other flight plans 122 will be obvious to those of ordinary skill in the art having the benefit of this disclosure.

In one or more embodiments, either the memory 116 of the control device 102 or the memory 113 of the drone 101 can store one or more inspection programs that are used to ensure that the drone 101 captures a predefined set of still and video images during a terrestrial asset inspection. The one or more inspection programs can also include technical requirements for each still or video image to ensure that the same are properly captured. For example, when the drone 101 makes an exhaustive sweep above a terrestrial asset, in one or more embodiments a requirement may exist that at least two hundred photographs are captured per acre, with at least a ninety-percent area overlap between any two successive images. Similarly, the requirements may require a minimum International Standards Organization (ISO) exposure setting, such as 100, for each image. Still other requirements will be described below with reference to subsequent figures. Still others will be obvious to those of ordinary skill in the art having the benefit of this disclosure.

Figure 2:
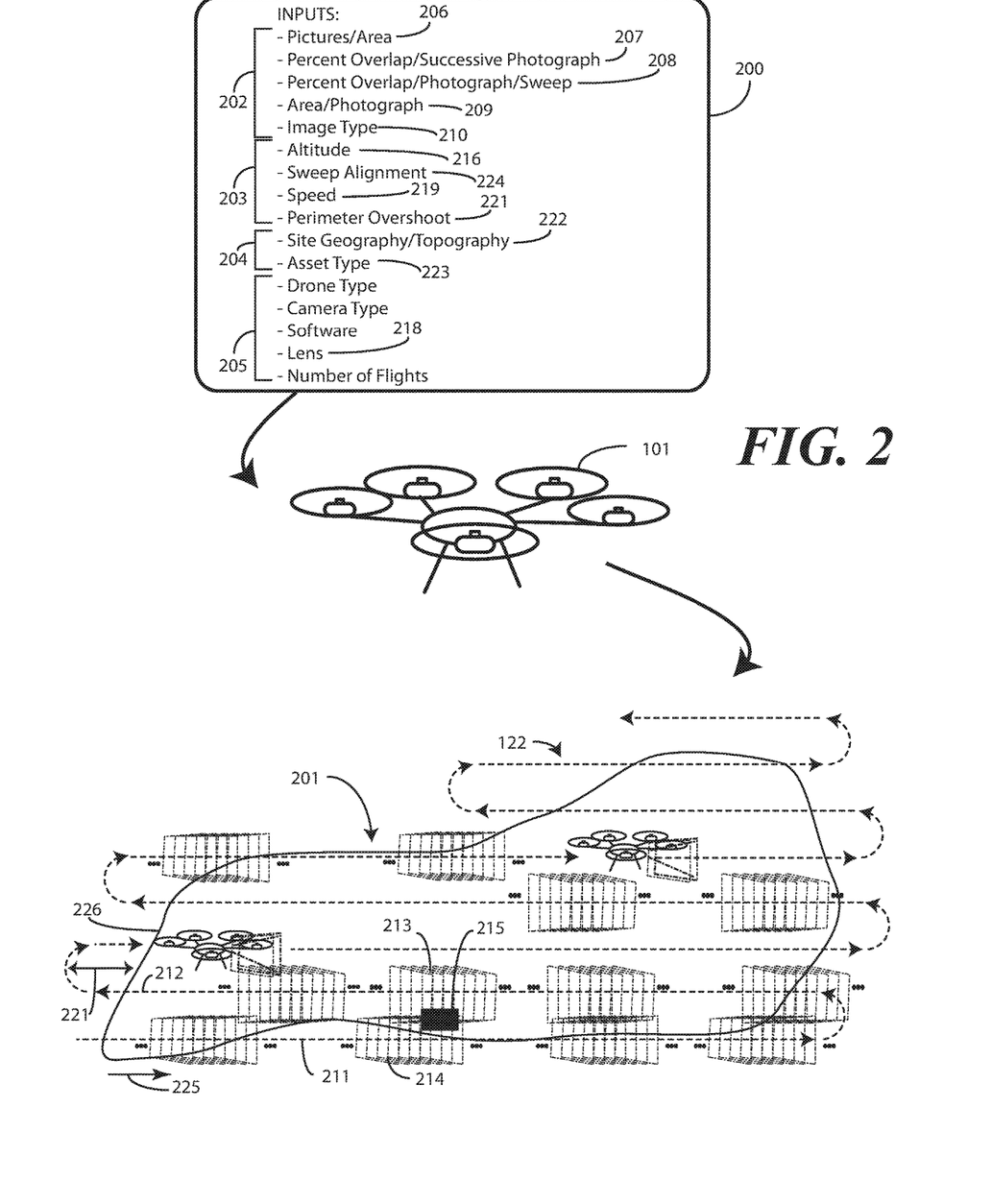
FIG. 2 illustrates another explanatory system in accordance with one or more embodiments of the disclosure.

Turning now to FIG. 2, illustrated therein are one or more parameters 200 that can be delivered to the one or more processors (105) of the drone 101 so that an inspection of a terrestrial asset 201 can most efficiently occur. The parameters 200 include image capture parameters 202, flight parameters 203, terrestrial asset parameters 204, and other parameters 205. Each of these parameters can be used to determine an optional flight plan 122 for inspecting the terrestrial asset 201.

In one or more embodiments, the image capture parameters 202 include a minimum number of images per unit area 206, a minimum percent overlap for any two adjacent images 207, a minimum percent overlap for images adjacent according to sweep 208, an amount of area to capture per image 209, and an image type 210. While these image capture parameters 202 can be configured in any number of ways, an example or two will provide context to exactly what each image capture parameter 202 defines.

For example, in one or more embodiments the minimum number of images per unit area 206 defines how many images should be captured per unit of geographical area. As noted above, in one or more embodiments the minimum number of images per unit area 206 is at least two hundred images per acre. Other minimum number of images per unit area 206 will be obvious to those of ordinary skill in the art having the benefit of this disclosure.

In one or more embodiments the minimum percent overlap for any two adjacent images 207 defines how much geographical area should be common to any two successive images. In one or more embodiments the minimum percent overlap for any two adjacent images 207 is at least ninety-percent overlap. Other minimum percentages overlap for any two adjacent images 207 will be obvious to those of ordinary skill in the art having the benefit of this disclosure.

In one or more embodiments the minimum percent overlap for images adjacent according to sweep 208 defines how much geographical area should be common to any images that capture common geographic area on different sweeps of the drone 101. For example, in FIG. 2, the drone makes eight sweeps—each sweep being represented by a horizontal dashed line over the terrestrial asset 201—when performing the inspection of the terrestrial asset 201. When making sweep 211 and sweep 212, certain images 213 will capture a geographic area 215 that other images 214 also capture. In one or more embodiments the minimum percent overlap for images adjacent according to sweep 208 is at least ninety-percent overlap, just as it was for the minimum percent overlap for any two adjacent images 207. In other embodiments, the minimum percent overlap for images adjacent according to sweep 208 is greater than the minimum percent overlap for any two adjacent images 207. In still other embodiments, the minimum percent overlap for images adjacent according to sweep 208 is less than the minimum percent overlap for any two adjacent images 207. Other minimum percentages overlap for images adjacent according to sweep 208 will be obvious to those of ordinary skill in the art having the benefit of this disclosure.

In one or more embodiments the amount of area to capture per image 209 defines how much geographical area should be captured in any one image. This can be related to flight parameters 203, such as altitude 216, or other parameters 205, such as camera type 217 or lens type 218. In one or more embodiments, the amount of area to capture per image 209 is between 100 and 150 square feet. Other minimum amounts of area to capture per image 209 will be obvious to those of ordinary skill in the art having the benefit of this disclosure.

The image type 210 defines what type of image is captured. The image type 210 can be a normal photographic image, a video image, an infrared photographic image, an infrared video image, or other image type. Still other image types 210 will be obvious to those of ordinary skill in the art having the benefit of this disclosure.

The flight parameters 203 can include flight speed 219, altitude 216, flight alignment 224, and overshoot metric 221. In one or more embodiments, where the flight plan 122 is determined at least as a function of the minimum number of images per unit area 206, the minimum overlap amount of any two adjacent images 207, and the minimum percent overlap for images adjacent according to sweep 208, these image capture parameters 202 will dictate each of the flight speed 219, the altitude 216, and the overshoot metric 221. It should be noted that the overshoot metric 221 is the distance 225 beyond the perimeter 226 of the terrestrial asset 201 that the drone 101 flies before turning.

To provide some context, experimental testing has shown that examples of the flight speed 219 are about 12.5 miles per hour. An example of the altitude 216 is between 100 and 150 feet. An example of overshoot metric 221 is about one hundred feet. Of course, these are examples only. Other parameters for of the flight speed 219, the altitude 216, and the overshoot metric 221 will be obvious to those of ordinary skill in the art having the benefit of this disclosure.

Flight alignment 224 can include the definition of a initial vector heading 225 along which the flight plan 122 will begin. On one or more embodiments, as will be shown in FIG. 4 below, the initial vector heading 224 is aligned with at least one row of solar panels where the terrestrial asset 201 is a solar panel farm. This allows the drone 101 to fly parallel to each row of solar panels along the flight path 122.

The terrestrial asset parameters 204 can include site geographical boundary information 222 or topographical parameters, asset type 223, or other parameters. In one or more embodiments, the site geographical boundary information 222 or site topography parameters include geographical boundary information corresponding to the terrestrial asset 201. This includes, in one embodiment, information defining the perimeter boundary 226 defining the extent of the terrestrial asset 201. The asset type 223 can identify the type of terrestrial asset 201, e.g., whether the terrestrial asset 201 is a solar panel farm, a forest, or other asset. Other terrestrial asset parameters 204 will be obvious to those of ordinary skill in the art having the benefit of this disclosure.

The other parameters 205 can include the type of drone 101, the type of software operating on the one or more processors (105), and the number of successive flights that should be made during the inspection. Still other parameters suitable for use in constructing a flight plan 122 to perform an inspection of a terrestrial asset 201 will be obvious to those of ordinary skill in the art having the benefit of this disclosure.

Figure 3:
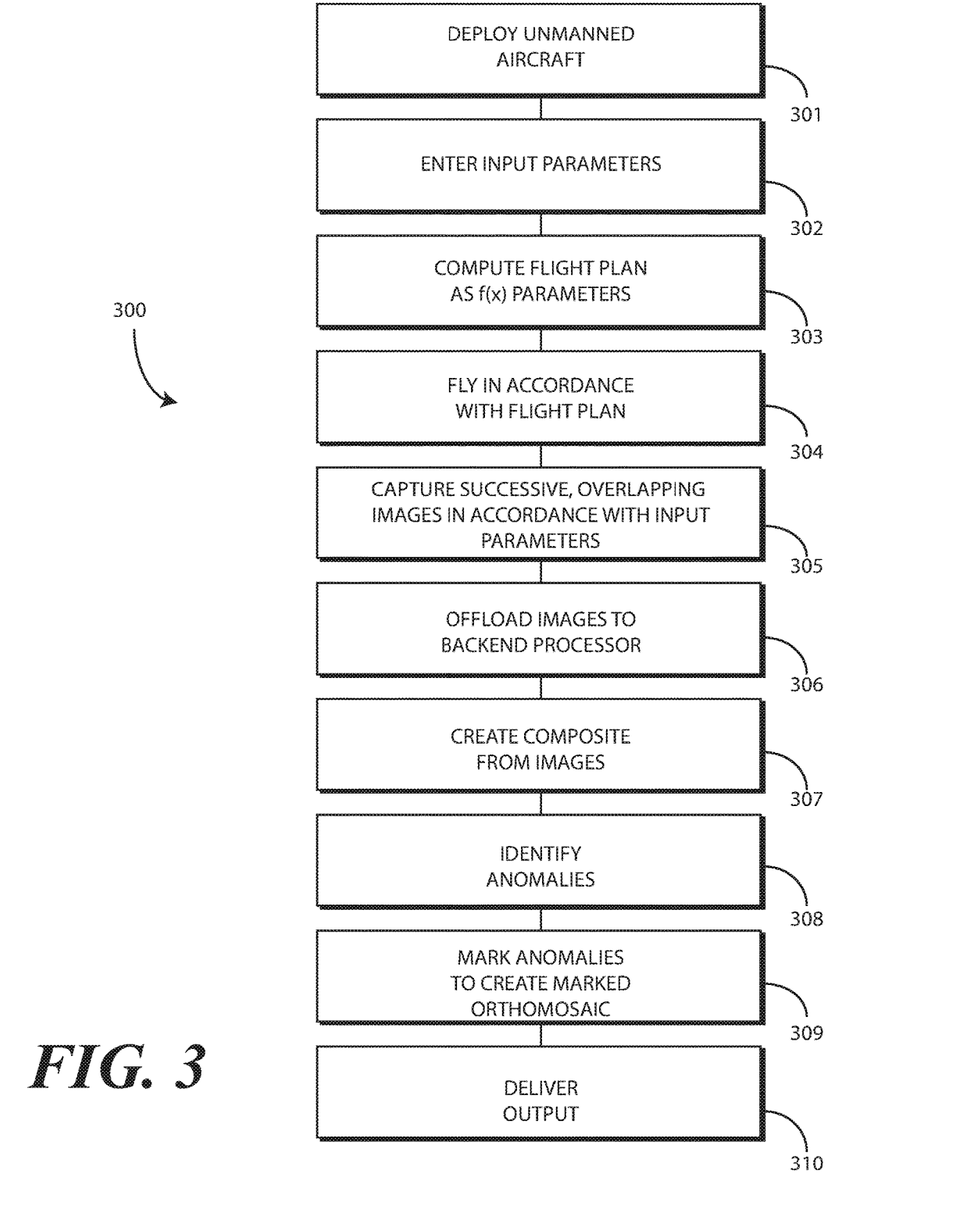
FIG. 3 illustrates one explanatory method in accordance with one or more embodiments of the disclosure.

Turning now to FIG. 3, illustrated therein is one explanatory method 300 suitable for use with the system of FIG. 2 to preform an inspection of a terrestrial asset (201). Embodiments of the disclosure provide predefined steps, such as aligning the initial vector heading (225) with a major axis of a terrestrial asset element when beginning a flight plan (122) because experimental testing has demonstrated these predefined steps to increase the efficiency of subsequent review of inspection data captured by the drone (101). Moreover, the subsequent steps are arranged in a predefined order that optimizes the efficiency of review of the inspection data when this data is catalogued in a web portal and distributed to individual clients across a network.

In one or more embodiments, the method 300 of FIG. 3 begins at step 301 with a deployment of a drone (101) at a terrestrial asset (201) to be inspected. This deployment can include one or more pre-flight checks to ensure that the drone (101) has sufficient energy in the energy storage device (121) to perform the inspection and that the drone (101) is communicating properly with the control device (102).

In one or more embodiments, the deployment occurring at step 301 comprises placing the drone (101) on the ground at or near an initial location of a flight plan (122). As will be described in subsequent steps, the method 300 includes elevating the drone (101) to a predefined altitude and flying the drone (101) along the flight plan (122) to fully inspect the terrestrial asset (201).

At step 302, input parameters are delivered to the one or more processors (105) of the drone (101). Note that step 302 can be performed before, or after, step 301. In one or more embodiments, at step 302 the one or more processors (105) receive one or more image capture parameters (202). These image capture parameters (202) can include a minimum number of images per unit area (206) and a minimum overlap amount for any two adjacent images (207) as previously described.

Step 302 can include the one or more processors (105) receiving additional parameters as well. For example, in one embodiment, the image capture parameters (202) received at step 302 include an initial vector heading (225) corresponding to a major axis of an asset, e.g., a row of solar panels, for the terrestrial asset (201) for the drone (101). In one embodiment, step 302 includes receiving an overshoot metric (221) beyond which the drone (101) will fly beyond a geographical boundary, e.g., perimeter (226) of the terrestrial asset (201) during the flight.

In one embodiment, step 302 includes the one or more processors (105) receiving a desired flight altitude (216) and/or a desired flight speed (219). In one or more embodiments, step 302 includes the one or more processors (105) receiving geographical boundary information (222). Step 302 can include the one or more processors (105) receiving lens type (218), such as an angle of view that the image capture device (108) can see in each image. Any of the parameters (200) set forth in FIG. 2 can be delivered to the one or more processors (105) of the drone (101) at step 302. Still other parameters suitable for delivery to the drone (101) at step 302 will be obvious to those of ordinary skill in the art having the benefit of this disclosure.

At step 303, in one or more embodiments the one or more processors (105) of the drone compute a flight plan (122). Said differently, in one embodiment step 303 includes determining, with the one or more processors (105), at least one flight plan (122) as a function the input received at step 302. For example, the flight plan (122) can be determined as a function of each of the minimum number of images per unit area (206), the minimum overlap amount for any two adjacent images (207), and the geographical boundary information (222). Similarly, the flight plan (122) can be determined further as a function of the initial vector heading (225).

In still other embodiments, the flight plan (122) can be determined further as a function of the overshoot metric (221). Similarly, the flight plan (122) can be determined further as a function of the desired flight altitude (216). Likewise, the flight plan (122) can be determined further as a function of the desired flight speed (219). The flight plan (122) can be determined further as a function of one or more lens parameters defining an angle of view of the image capture device, and so forth. Of course, combinations of the factors set forth above can be used to compute the flight plan (122). Other factors will be obvious to those of ordinary skill in the art having the benefit of this disclosure.

At step 304, the one or more processors (105) of the drone (101) fly the drone (101) in accordance with the at least one flight plan (122) determined at step 303. At step 305, the image capture device (108) captures a plurality of images meeting or exceeding both the minimum number of images per unit area (206) and the minimum overlap between any two adjacent images (207), as well as any other parameters received at step 302 that may affect the number of images captured.

In one or more embodiments, the steps of the method 300 occur autonomously. For example, instructions stored in the memory (113) of the drone (101) can cause the drone (101) to execute each step, thereby locating and passing through each inspection point. In one or more embodiments, quality controls can also be stored in the memory (113) of the drone (101) to ensure that the image quality captured meets one or more predefined requirements.

At step 306, in one embodiment the drone (101) can offload the plurality of images to a backend processor. In one or more embodiments, the backend processor includes an image assembly deice, an optical identification device, a marking device, and a communication device. These devices can be integrated into a single backend processor in one embodiment. In other embodiments, these devices can be separate devices in communication with each other.

In one or more embodiments, one or more of the backend processor, the image assembly device, the optical identification device, the marking device, and/or the communication device is a computing device. In one embodiment, the computing device is independent of the drone (101) and should not be interpreted as having any dependency or requirement relating to any one component or combination of components of the drone (101).

In one or more embodiments, the computing device includes a memory, one or more processors, a communication device, one or more input/output ports, one or more input/output components, an optionally a buss or busses connecting these components.

Illustrating by example, any of the image assembly deice, the optical identification device, and the marking device can comprise a hardware device having a memory, which may be solid-state memory, hard drives, optical-disc drives, and so forth. Any of the image assembly device, the optical identification device, and the marking device can comprise one or more processors that read data from various entities such as memory, the communication device, the input/output ports, and/or the input/output components. The input/output ports and components allow the computing device to be logically coupled to other devices, some of which may be built into or integrated with the computing device. Examples include a Universal Serial Bus (USB) jack, stereo jack, infrared port, proprietary communications port(s), satellite dish, keyboard, touchscreen, sensor(s), micro-electro-mechanical-systems (MEMS) devices, microphone, scanner, printer, wireless device, and any other item usable to directly or indirectly input data into computing device.

At step 307, in one embodiment the plurality of images captured by the drone (101) at step 305 are delivered to the image assembly device. In one or more embodiments, the image assembly device assembles the plurality of images into a composite image of the terrestrial asset (201). At step 308, in one embodiment the composite image is delivered from the image assembly device to the optical identification device. At step 308, the optical identification device identifies one or more anomalies of the terrestrial asset (201) from the composite image.

Illustrating by example, where the terrestrial asset (201) is a solar panel farm, and the images captured at step 305 are infrared images, panels or cells that are not properly converting the solar energy to electricity will appear to be hotter due to the lack of conversion. Accordingly, in one or more embodiments the optical identification device can, at step 308, identify these spots as anomalies along the solar panel array.

In one or more embodiments, step 309 can include a marking device marking the one or more anomalies of the terrestrial asset (201) on the composite image, thereby creating a marked image. For example, the marking device can place a red box around each anomaly in one embodiment. Similarly, the marking device can place an arrow on the composite image to identify the anomaly. Other techniques for identifying the anomaly on the marked image will be obvious to those of ordinary skill in the art having the benefit of this disclosure.

At step 310, in one or more embodiments a communication device can deliver the marked image to a remote electronic device across a network. Illustrating by example, in one embodiment the communication device can deliver the marked composite image to a computer, tablet computer, smartphone, or other device across a network so that an owner of the terrestrial asset (201) can inspect the same.

Figure 4:
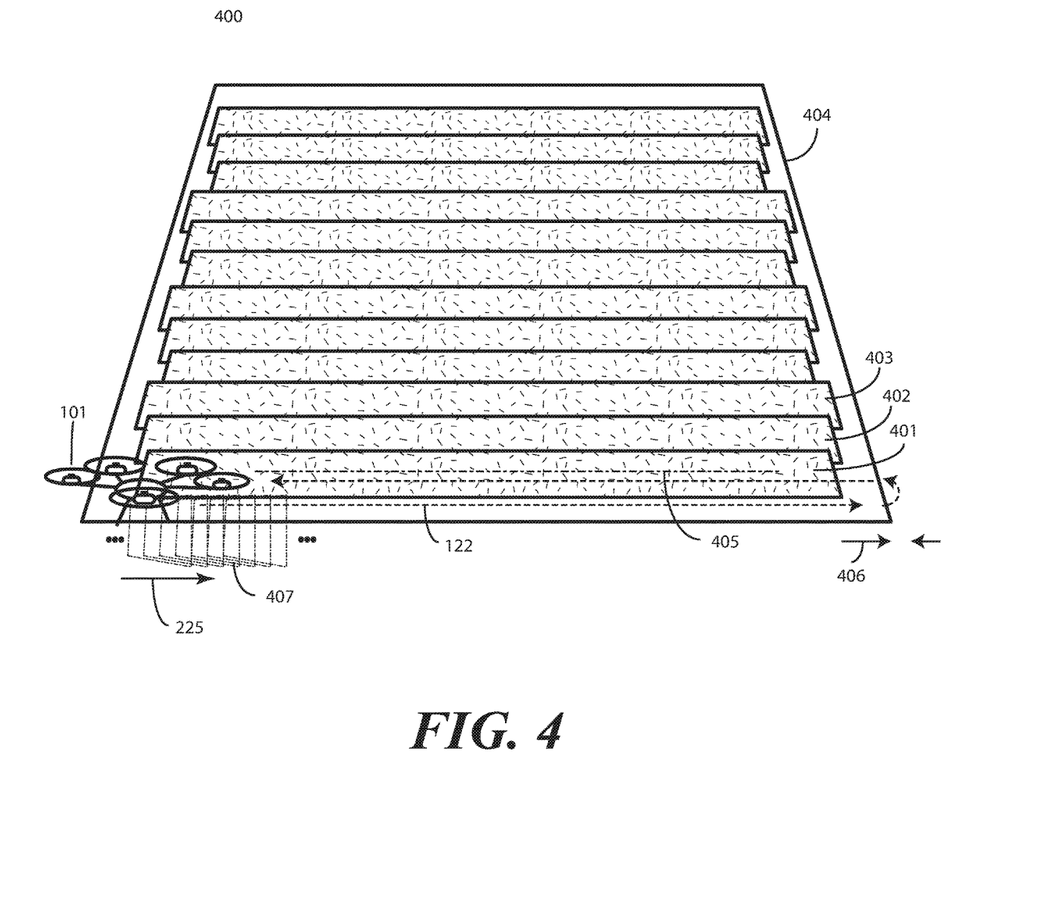
FIG. 4 illustrates one or more method steps in accordance with one or more embodiments of the disclosure.

Turning now to FIG. 4, illustrated therein is one or more method steps executed by the system of FIG. 2 in accordance with the steps of the method of FIG. 3. The terrestrial asset 400 shown in FIG. 4 is a solar panel farm consisting of one or more rows 401, 402, 403 of solar panels.

As shown, the drone 101 has received one or more image capture parameters (202) as previously described, as well as geographical boundary information (222) defining a perimeter boundary 404 of the solar panel farm. From this, one or more processors (105) of the drone have determined a flight plan 122 that the drone 101 will fly to inspect the solar panel farm.

It should be noted that only a portion of the flight plan 122 is shown in FIG. 4. This is because embodiments of the disclosure contemplate that the drone 101 may not be able to complete the entire flight plan 122 due to limited energy being stored in the energy storage device (121), which delivers energy to the propulsion system (106). Accordingly, the energy storage device (121) may need to be charged or replaced during the flight plan 122. For this reason, in one or more embodiments the one or more processors (105) fly only the portion of the flight plan 122 initially, with the portion being defined by an amount of stored energy being depleted to a level insufficient to drive the propulsion system (106). The operator can then change the energy storage device (121) or charge it, so that the drone 101 can continue flying the flight plan 122.

As shown in FIG. 4, the drone 101 begins its flight in accordance with an initial vector heading 225. In one or more embodiments, this initial vector heading 225 is aligned with a major axis 405 of at least one row 401 of solar panels in the solar panel farm. Additionally, as shown in FIG. 4, the flight plan 122 includes an overshoot metric that defines a distance 406 beyond which the drone 101 will fly past the perimeter boundary 404.

When the drone 101 starts flying in accordance with the flight plan 122, the image capture device (108) begins capturing successive images 407 of the terrestrial asset 400. In one or more embodiments, these successive images 407 comprise a plurality of images that meet or exceed at least a minimum number of images per unit area, such as two hundred images per acre, and a minimum overlap between any two adjacent images, such as a ninety-percent overlap.

Figure 5:
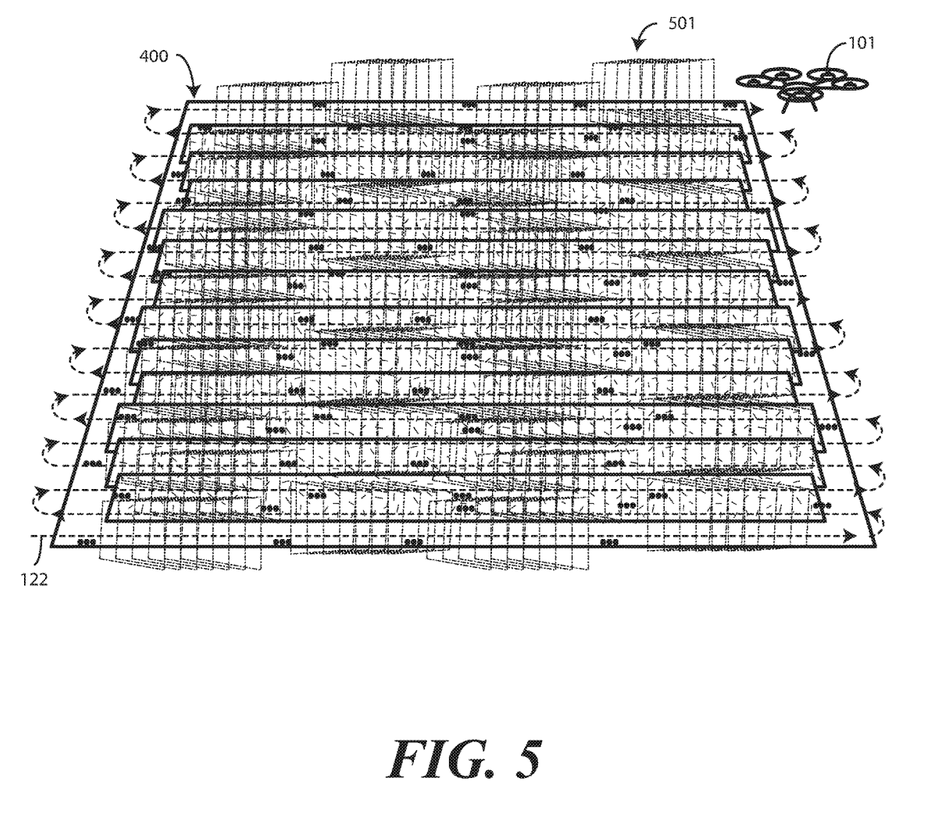
FIG. 5 illustrates one or more method steps in accordance with one or more embodiments of the disclosure.

Turning now to FIG. 5, the drone 101 has completed the flight plan 122. The drone 101 has captured a plurality of images 501. In this illustrative embodiment, not only does the plurality of images meet both the minimum number of images per unit area and the minimum overlap between any two adjacent images, but it also meets a ninety-percent overlap for adjacent images per sweep as well. Accordingly, a lot of images of the terrestrial asset 400 have been captured.

Figure 6:
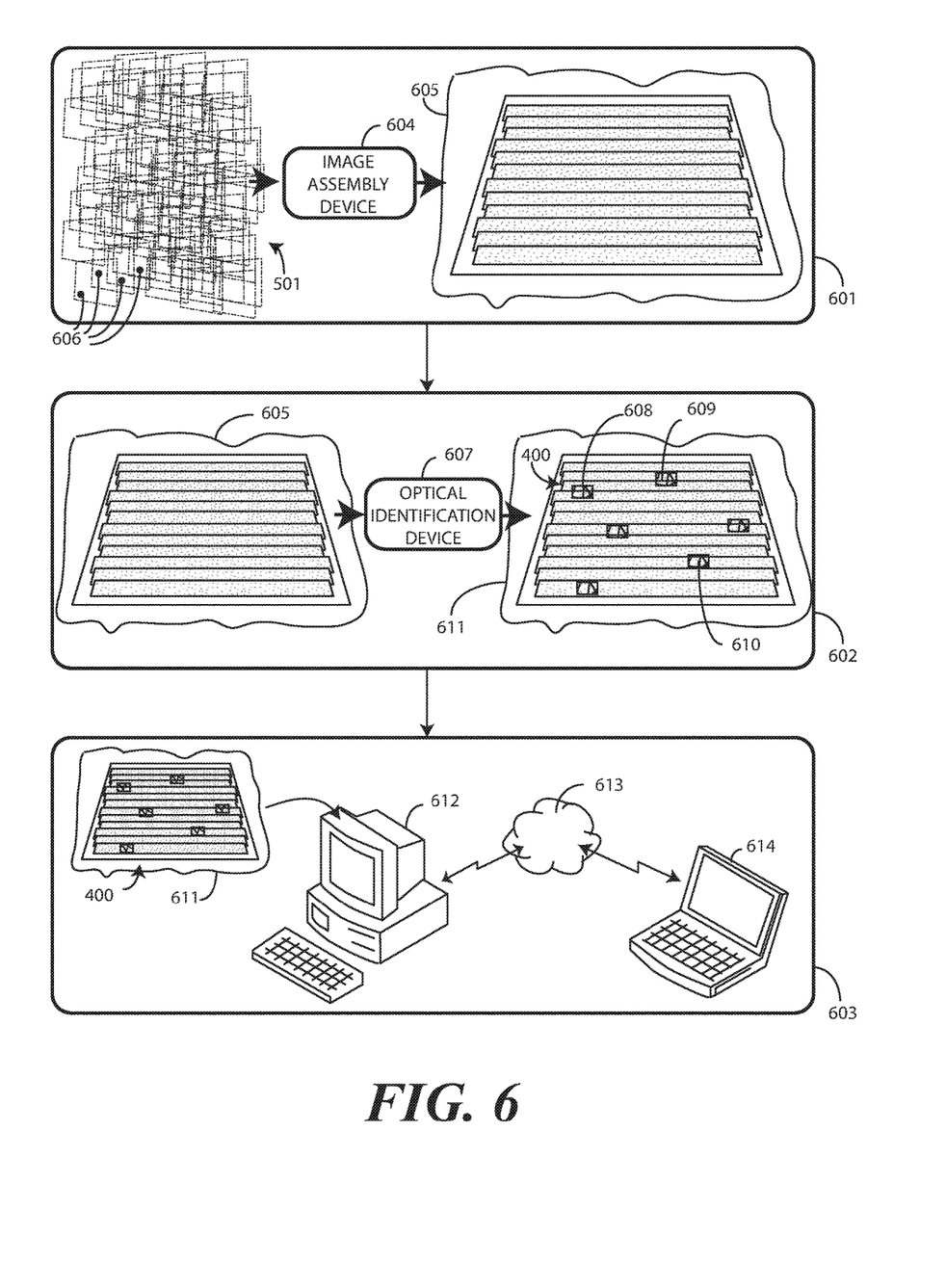
FIG. 6 illustrates one or more method steps in accordance with one or more embodiments of the disclosure.

Turning now to FIG. 6, illustrated therein are additional processing steps that can be performed on the plurality of images 501. Beginning at step 601, in one or more embodiments the plurality of images 501 is delivered to an image assembly device 604. The image assembly device 604 then stitches the plurality of images 501 into a composite, or orthomosaic, image 605.

In one or more embodiments, this is done using a tie point 606. For example, one or more images of the plurality of images 501 may capture a picture of a tie point 606, which may be a rock, landmark, telephone pole, building, property marker, or other visible object. In one or more embodiments, the image assembly device 604 identifies the tie point 606 across at least a subset of the plurality of images 501 and assembles the orthomosaic image 605 as a function of where the tie point 606 resides in each image. Other techniques for creating orthomosaic images from multiple images will be obvious to those of ordinary skill in the art having the benefit of this disclosure.

At step 602, the orthomosaic image 605 is delivered to an optical identification device 607. In one or more embodiments, the optical identification device 607, which is in communication with the image assembly device 604 in one embodiment, identifies one or more anomalies 608,609,610 of the terrestrial asset 400 from the orthomosaic image 605. In this illustrative embodiment, each anomaly 608,609,610 comprises a non-functional solar panel. In this illustrative embodiment, the optical identification device 607 also includes a marking device that marks, with a square in this embodiment, each anomaly of the terrestrial asset 400 on the orthomosaic image 605 to create a marked orthomosaic image 611.

At step 603, a communication device in a computing device 612 delivers, across a network 613, the marked orthomosaic image 611 to a remote electronic device 614. Accordingly, the owner of the terrestrial asset 400 can review not only the terrestrial asset 400, but the identified anomalies as well.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of inspecting a terrestrial asset, the method comprising:
   receiving, with one or more processors carried by an unmanned aircraft, one or more image capture parameters comprising at least:
     a minimum number of images per unit area; and
     a minimum overlap amount for any two adjacent images;
   receiving, with the one or more processors, geographical boundary information of the terrestrial asset;
   determining, with the one or more processors, at least one flight plan as a function of each of the minimum number of images per unit area, the minimum overlap amount for any two adjacent images, and the geographical boundary information;
   flying, by the one or more processors, the unmanned aircraft in accordance with the at least one flight plan; and
   capturing, with an image capture device carried by the unmanned aircraft, a plurality of images meeting or exceeding both the minimum number of images per unit area and the minimum overlap between any two adjacent images.

2. The method of claim 1, the one or more image capture parameters further comprising an initial vector heading for flying the unmanned aircraft relative to the terrestrial asset, the determining the at least one flight plan further occurring as a function of the initial vector heading.

3. The method of claim 2, the one or more image capture parameters further comprising an overshoot metric beyond which the unmanned aircraft will fly beyond a geographical boundary of the terrestrial asset, the determining the at least one flight plan further occurring as a function of the overshoot metric.

4. The method of claim 3, one or more image capture parameters further comprising a desired flight altitude, the determining the at least one flight plan further occurring as a function of the desired flight altitude.

5. The method of claim 4, the one or more image capture parameters further comprising a desired flight speed, the determining the at least one flight plan further occurring as a function of the desired flight speed.

6. The method of claim 3, the determining the at least one flight plan further occurring as a function of one or more lens parameters defining an angle of view of the image capture device.

7. The method of claim 2, further comprising:
delivering, from the unmanned aircraft, the plurality of images to an image assembly device; and
assembling, with the image assembly device, the plurality of images into a composite image of the terrestrial asset.

8. The method of claim 7, further comprising:
identifying, with an optical identification device, one or more anomalies of the terrestrial asset from the composite image; and
marking, with one or more other processors operable with the optical identification device, the one or more anomalies of the terrestrial asset on the composite image, thereby creating a marked composite image.

9. The method of claim 8, further comprising delivering, with a communication device operable with the one or more other processors, the marked composite image to a remote electronic device across a network.

10. A terrestrial asset inspection system, comprising:
an unmanned aircraft, comprising one or more processors operable with an image capture device and a propulsion system;
the one or more processors:
receiving one or more image capture parameters comprising at least:
a minimum number of images per unit area; and
a minimum overlap amount for any two adjacent images;
receiving geographical boundary information of the terrestrial asset;
determining at least one flight plan as a function of each of the minimum number of images per unit area, the minimum overlap amount for any two adjacent images, and the geographical boundary information; and
flying, by controlling the propulsion system, the unmanned aircraft in accordance with the at least one flight plan;
the image capture device:
capturing a plurality of images meeting or exceeding both the minimum number of images per unit area and the minimum overlap between any two adjacent images.

11. The terrestrial asset inspection system of claim 10, the unmanned aircraft further comprising an energy storage device delivering energy to the propulsion system, wherein the flying comprises flying a portion of the at least one flight plan until an amount of stored energy is depleted to a level insufficient to drive the propulsion system.

12. The terrestrial asset system of claim 11, further comprising an image assembly device, the image assembly receiving device receiving the plurality of images from the unmanned aircraft and assembling an orthomosaic image from the plurality of images.

13. The terrestrial asset system of claim 12, the image assembly device identifying a tie point across at least a subset of the plurality of images, the assembling the orthomosaic image occurring as a function of the tie point.

14. The terrestrial asset system of claim 13, further comprising an optical identification device in communication with the image assembly device, the optical identification device identifying one or more anomalies of the terrestrial asset from the orthomosaic image.

15. The terrestrial asset system of claim 14, further comprising a marking device operable with the optical identification device, the marking device marking the one or more anomalies of the terrestrial asset on the orthomosaic image to create a marked orthomosaic image.

16. The terrestrial asset system of claim 15, further comprising a communication device operable with the marking device, the communication device delivering, across a network, the marked orthomosaic image to a remote electronic device.

17. The terrestrial asset system of claim 16, the terrestrial asset comprising a solar panel farm.

18. The terrestrial asset system of claim 17, wherein the at least one flight plan comprises an initial vector heading, wherein the initial vector heading is aligned with at least one row of solar panels of the solar panel farm.

19. The terrestrial asset system of claim 18, wherein the solar panel farm comprises a perimeter boundary, wherein the at least one flight plan defines an overshoot metric beyond which the unmanned aircraft will fly beyond the perimeter boundary.

20. The terrestrial asset system of claim 19, wherein the a minimum number of images per unit area comprises 200 images per acre, wherein the minimum overlap amount for any two adjacent images comprises a ninety-percent overlap.

* * * * *